United States Patent [19]

Topić et al.

[11] Patent Number: 4,677,420

[45] Date of Patent: Jun. 30, 1987

[54] WEAR INDICATOR FOR FRICTION LININGS

[75] Inventors: Aloyzija Topić, Koblenz; Bernd-Holger Röhling, Andernach, both of Fed. Rep. of Germany

[73] Assignee: Lucas Industries public limited company, Birmingham, England

[21] Appl. No.: 822,271

[22] Filed: Jan. 24, 1986

[30] Foreign Application Priority Data

Feb. 4, 1985 [DE] Fed. Rep. of Germany ... 8502975[U]

[51] Int. Cl.[4] .................... B60Q 1/00; G01D 21/00
[52] U.S. Cl. ................... 340/52 A; 340/52 B; 116/208; 188/1.11
[58] Field of Search .............. 340/52 A, 52 R, 52 B; 116/208; 188/1.11

[56] References Cited

U.S. PATENT DOCUMENTS

| | | | |
|---|---|---|---|
| 3,639,895 | 2/1972 | Wilhelmi | 340/52 A |
| 4,183,012 | 1/1980 | Kimura | 340/52 A |
| 4,241,327 | 12/1980 | Yamamoto | 340/52 A |
| 4,498,559 | 2/1985 | Katagiri et al. | 116/208 |
| 4,606,435 | 8/1986 | Johnson | 340/66 |

Primary Examiner—Donnie L. Crosland
Attorney, Agent, or Firm—Scrivener and Clarke

[57] ABSTRACT

The cable (70) of a wear indicator for friction linings (54) of a spot-type disc brake having a floating caliper (12) is received in a trough (72) of the contact pressure web (62) of a hold-down spring (60) for the lining so as to protect the cable from damage. The trough is covered by a sheet metal member (74).

7 Claims, 5 Drawing Figures

WEAR INDICATOR FOR FRICTION LININGS

The invention relates to a wear indicator for the friction linings of a spot-type disc brake, comprising a hold-down spring for the lining which spring is formed with at least one contact pressure web pressing on backplates of the friction linings so as to press them into contact without rattling, together with the brake pads, further comprising a wear indicating sensor which is fastened to the friction lining backplate such that a wear indicating signal is released upon predetermined wear of the friction linings.

A wear indicator of this kind is known from DE-PS No. 28 27 035. In that case current leads for the sensor are positioned by having a fastening portion of the sensor clamped in a resilient holding device.

DE-OS NO. 20 48 964 discloses a friction lining wear warning means including a ceramic body which is shaped and positioned such that the backplates carrying the friction linings will break the ceramic bodies when the friction linings are worn. An electric resistance coating is applied on the ceramic body so that the resistance of the corresponding circuit will change as the ceramic body breaks. And this is utilized for indicating purposes.

If both the inner and the outer friction linings with respect to the vehicle equipped with a disc brake are provided with a wear indicator each, the cable leading to the wear indicator of the outer friction lining with respect to the vehicle must be passed over the brake disc.

It is difficult to pass away the cable leading to the outer friction lining because there is but little space available between the outer diameter of the brake disc and the inner diameter of the wheel rim. An exposed cable, therefore, could rub on the disc or rim and become damaged.

There is a risk of mud and dirt collecting at the inner wall of the rim especially when driving off the roads. This also could cause damage of the cable.

It is an object of the invention to provide a wear indicator with which the cable leading to the outer friction lining with respect to the vehicle is not exposed to any danger. Specifically, the mounting of the cable is not to require any particular new structural elements and permit easy retrofitting in vehicles already in use.

This object is met, in accordance with the invention, in that the cable leading to the wear indicating sensor is laid in a trough which is formed in at least one of the contact pressure webs of the hold-down spring for the friction lining.

The hold-down spring for the linings already is disposed across both backplates, straddling the brake disc in order that the friction linings may be supported without rattling. The contact pressure webs of the hold-down spring which abut the backplates of the friction linings are designed to have troughs in accordance with the invention. Therefore, they can receive and protect the cable leading to the wear indicating sensor.

The cable is prevented from slipping out of the trough in the contact pressure web of the hold-down spring for the friction lining by being secured in place. In accordance with a further development of the invention a sheet metal member serves to secure the cable in the trough which preferably is semicircular in cross section. The sheet metal member covers the trough and is so designed that its one edge embraces the contact pressure web forming the trough, while its other edge is fixed to the contact pressure web by means of an elastic snap catch. In covering the trough, the sheet metal member secures the cable leading to the wear indicating sensor in the trough and protects it against becoming damaged.

The invention will be described further with reference to the accompanying drawings, in which:

FIG. 1 shows a disc brake for motor vehicles partly in section. The sectional plane contains a secant of the corresponding brake disc 10 indicated in dash-dot lines and extends parallel to the axis A thereof.

Figure 1:
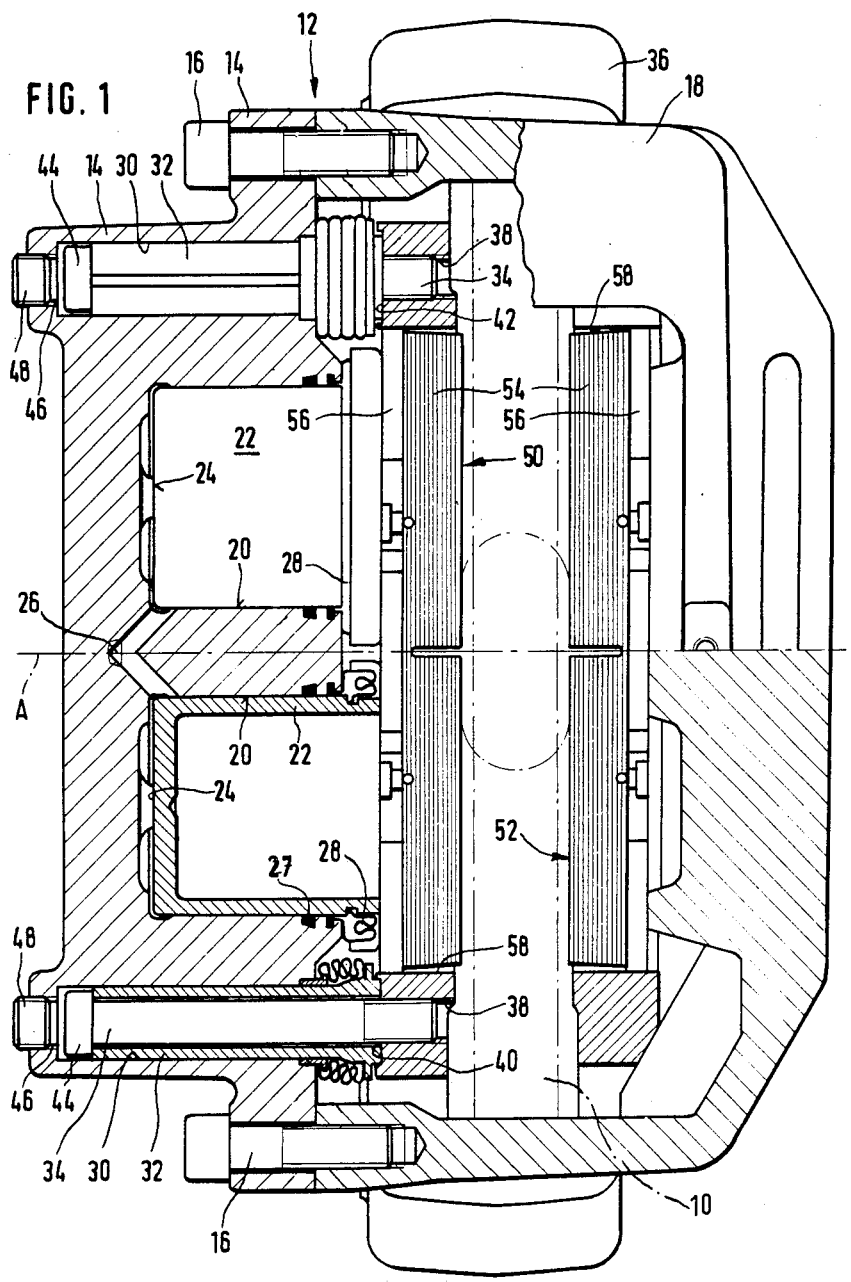
FIG. 1 shows a disc brake in which the wear indicator according to the invention is used.

The disc brake comprises a floating caliper 12 composed of a cylinder casing 14 and a frame member 18 fastened to the same by bolts 16. The cylinder casing 14 presents the inner part of the caliper 12 with respect to the corresponding vehicle. Starting from the cylinder casing 14, the frame member extends across the brake disc 10 and in chord-like fashion on the side thereof remote from the cylinder casing 14. The cylinder casing 14 comprises an actuator 20,22 including two cylindrical bores 20 in parallel with the axis A and each guiding a piston 22 which is supported, in the mounting position illustrated, on a projection 24 formed in the center of the corresponding cylindrical bore 20. Behind the pistons 22 a branching pressure fluid passage 26 opens into each cylindrical bore 20. The two pistons 22 project out of their cylindrical bores 20 in the direction of the brake disc 10 and are sealed with respect to the cylinder casing 14 by means of a sealing member 28 each.

The cylinder casing 14 further comprises two guide bores 30 which likewise extend parallel to the axis A and lie in the same plane as the cylindrical bores 20 disposed between the two guide bores 30. Each guide bore 30 guides a guide pin 32 which is hollow and fastened to a brake carrier member 36 by a screw 34 passing through the hollow pin. The brake carrier member 36 is formed with a threaded bore 38 for each of the two screws 34. The threaded bores 38 each begin at a recess 40 and 42, respectively, in the brake carrier member 36.

The lower recess 40 in FIG. 1 has a diameter which is adapted closely to the outer diameter of the end of the corresponding guide pin 32 so that the latter is held in position in form lock. The upper recess 42 in the drawing for the other guide pin 32 has a greater diameter so this other guide pin can adapt to the position of the corresponding guide bore 30 and become fixed in force lock with respect to the brake carrier member 36 only by tightening of the corresponding screw 34.

The screws 34 each have a hollow hexagonal head 44 so that they may be tightened by means of a hexagon spanner which is introduced through a threaded bore 46 each in the cylinder casing 14. Subsequently the threaded bores 46 are closed tightly by a threaded plug 48 each.

The two pistons 22 each have an annular end face in direct engagement with a directly operable brake pad 50 which is moved into abutment against the inner side of the brake disc with respect to the vehicle by extending the pistons 20. An indirectly operable brake pad 52 is coordinated with the other side of the brake disc 10, being the outer side with respect to the vehicle. It is adapted to be engaged with the brake disc 10 by the reactive forces acting on the cylinder casing 14 in response to the hydraulic pressure in the cylindrical bores 20 and pushing the caliper 12 axially inwardly with respect to the vehicle, to the left in the drawing. Each of the two brake pads 50 and 52 comprises a friction lining 54 and a backplate 56 which supports the same and is guided between paraxial guide faces 58 of the brake carrier member 36. The brake pressures acting on the brake pads 50 and 52 in the direction of the secant of the brake disc 10 during braking are carried off directly to the brake carrier member 36 by the backplates 56 and through the guide faces 58 so that the caliper 12 and consequently also the guide pins 32 are not loaded by them.

Figure 2:
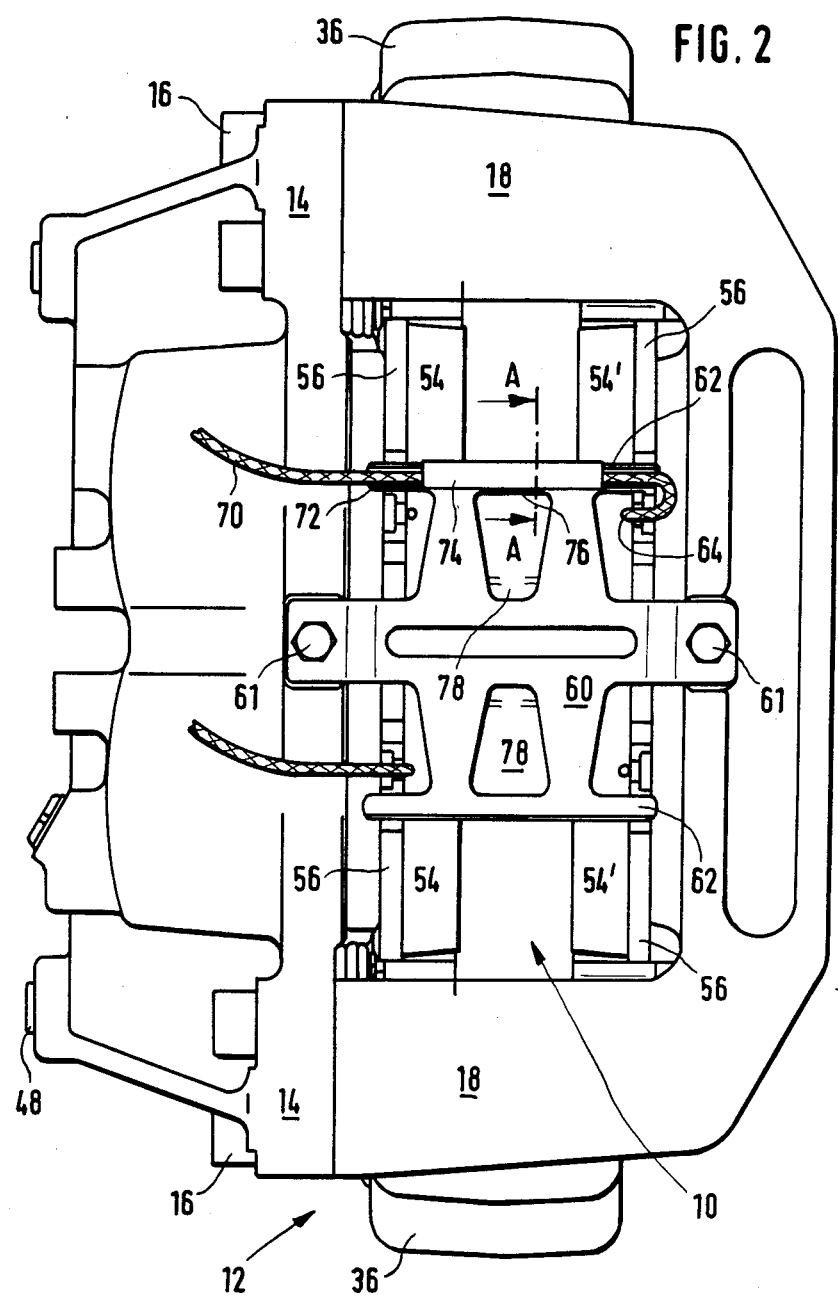
FIG. 2 is a top plan view of the wear indicator according to the invention.

FIG. 2 shows the wear indicator used in the brake disc according to FIG. 1. A hold-down spring 60 of spring plate arms is fastened to the caliper 12 by screws 61. The hold-down spring 60 presses on the backplates 56 underneath and thus prevents them from rattling. Contact pressure webs 62 are formed integrally with the hold-down spring 60 for the linings and they lie directly against the backplates 56 of the friction linings (see also FIG. 3). The wear indicating sensor 64 extends through the backplate 56 and into the outer friction lining 54'. If the outer friction lining 54' is worn, the brake disc 10 exposes the conductor 66 (see also FIG. 3) freeing it of its insulating sheath 68 so that an electrical contact is made which is utilized in conventional manner for indicating the wear. The cable 70 leading to the wear indicating sensor is received in a trough 72 of the contact pressure web 62 of the hold-down spring 60, as may be seen in detail in FIG. 3.

Figure 3:
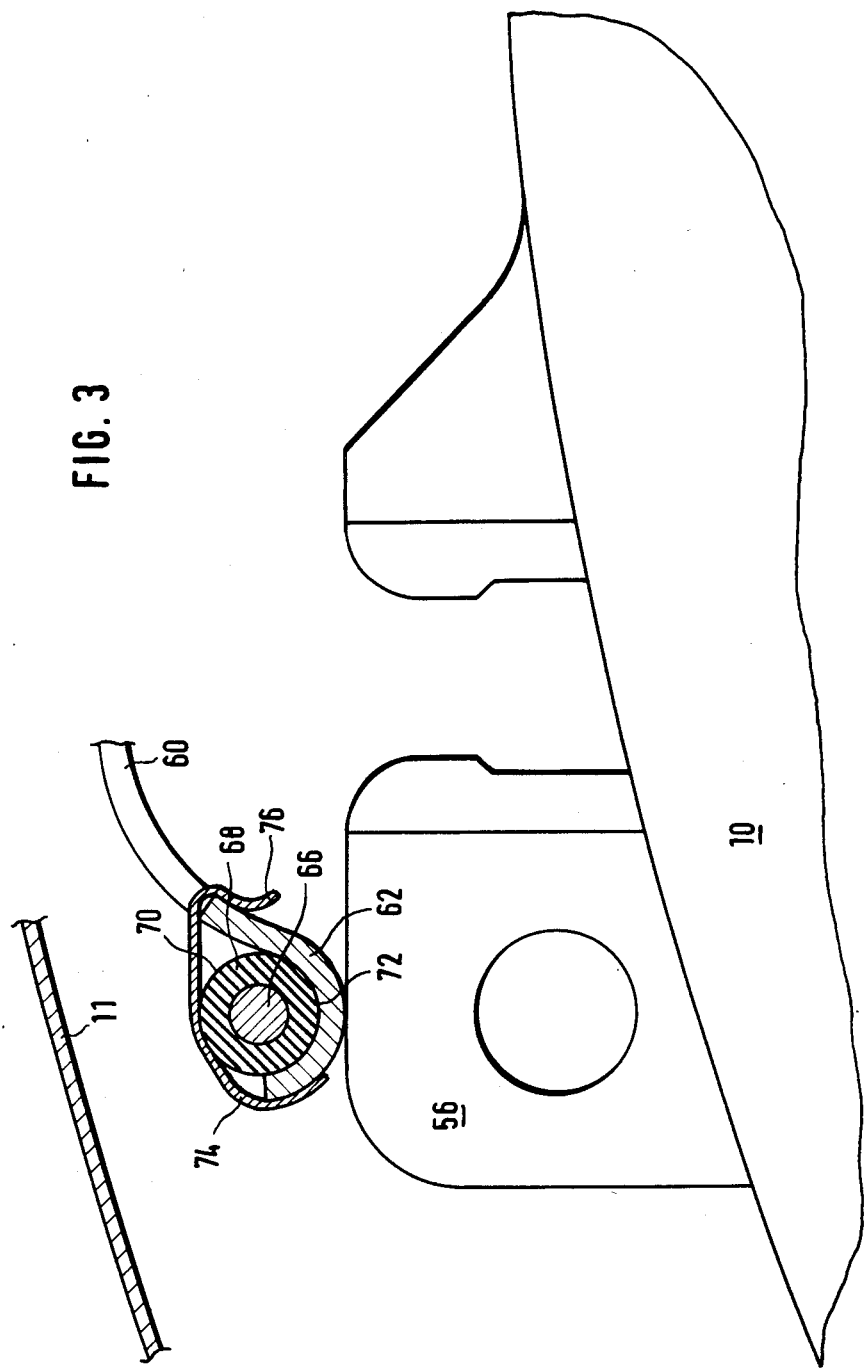
FIG. 3 is a sectional elevation along line A—A in FIG. 2

FIG. 3 shows part of the hold-down spring 60 for the friction linings, including the contact pressure web 62 in which a trough 72 is formed so as to be approximately semicircular in cross section. The trough 72 takes up the cable 70 leading to the wear indicating sensor 64. As shown in the section, the cable 70 consists of a conductor 66 surrounded by an insulating sheath 68. A sheet metal member 74 is placed on top of the trough 72 to cover the same and the lead 70 inside it. As shown in FIG. 3, the sheet metal member 74 embraces one edge of the contact pressure web 62, while the opposite edge of the sheet metal member 74 is provided with a snap catch 76 engaging in a recess 78 formed in the hold-down spring 60. The sheet metal member 74 thus may be slipped by hand in form lock on the contact pressure web 62 to arrest the cable 70. Next to the brake disc 10 FIG. 3 also shows the wheel rim 11, and it is obvious that the cable 70 cannot suffer damage from any dirt which may stick to the rim 11. As the sheet metal member 74 is of symmetrical design it may be used for right- and left-hand brakes alike.

Figure 4:
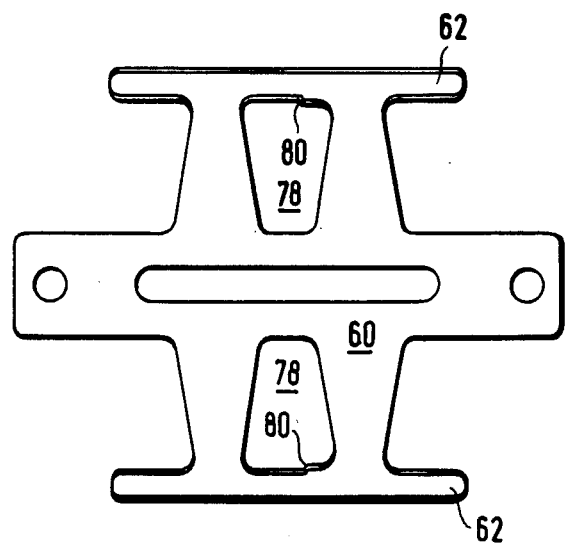
FIGS. 4 and 5 show modified embodiments.

FIG. 4 is a top plan view of another embodiment of a holddown spring 60 for the friction lining corresponding to the embodiment described previously, with the exception of the step 80 formed in the recess 78.

Figure 5:
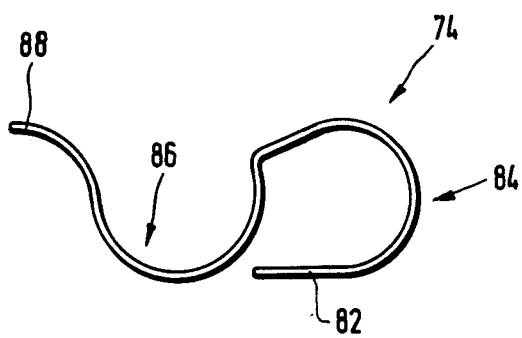

FIG. 5 shows another embodiment of the sheet metal member 74 serving as the retainer of the cable. It is shown laterally inverted as compared to the embodiment of FIG. 3 and, by comparison with FIG. 3, this embodiment of the sheet metal member 74 comprises an extended arm 82 reaching as far as below the contact pressure web 62 and being supported on the backplate 56 of the friction lining. At a place marked 84 the sheet metal member 74 narrows, thereby merging into the arm 82. An arc 86 formed engages in the recess 78 and the tail 88 of the arc 86 is supported at the opposite end of the recess 78.

What is claimed is:

1. A wear indicator for a friction lining of a pad for a spot type disc brake, said pad including a backing plate carrying said friction lining, said indicator comprising a hold-down spring having at least one contact pressure web pressing on said backing plate, a wear indicator sensor which releases a signal upon predetermined wear of the friction lining, a cable leading to the indicator sensor, said hold-down spring including a trough formed in said contact pressure web, said cable received in said trough.

2. The wear indicator as claimed in claim 1, characterized in that the trough is at least approximately semicircular in cross section.

3. The wear indicator of claims 1 or 2 including a sheet metal member adapted to cover said trough.

4. The wear indicator as claimed in claim 3, characterized in that the sheet metal member is adapated to be fastened to the contact pressure web (62) by a snap catch.

5. The wear indicator as claimed in claims 1 or 2, wherein said wear indicator sensor comprises an electrical conductor enclosed by an insulating sheath and received in said friction lining such that the insulating sheath is worn off upon predetermined wear of the friction lining.

6. The wear indicator as claimed in claims 1 or 2, wherein the hold-down spring for said pad is formed with two contact pressure webs each provided with a trough to receive the cable leading to the wear indicating sensor.

7. The wear indicating sensor as claimed in claim 1 or 2, wherein the wear indicating sensor is fastened to the backplate of said pad.

* * * * *